(12) United States Patent  
Tanaka et al.

(10) Patent No.: US 8,460,953 B2  
(45) Date of Patent: Jun. 11, 2013

(54) MANUFACTURING METHOD FOR LIQUID CRYSTAL APPARATUS

(75) Inventors: Shinichiro Tanaka, Tottori (JP); Masakatsu Higa, Tottori (JP); Shuhei Yoshida, Tottori (JP)

(73) Assignee: Japan Display West Inc., Aichi-Ken (JP)

( * ) Notice: Subject to any disclaimer, the term of this patent is extended or adjusted under 35 U.S.C. 154(b) by 103 days.

(21) Appl. No.: 13/081,880

(22) Filed: Apr. 7, 2011

(65) Prior Publication Data

US 2011/0183451 A1 Jul. 28, 2011

(51) Int. Cl.  
*H01L 33/58* (2010.01)

(52) U.S. Cl.  
USPC ..................... 438/30; 257/E33.067

(58) Field of Classification Search  
USPC ..................... 438/30; 257/E33.067  
See application file for complete search history.

(56) References Cited

U.S. PATENT DOCUMENTS

| 5,689,318 | A * | 11/1997 | Matsuyama et al. | 349/106 |
| 6,352,804 | B1 * | 3/2002 | Sakamoto et al. | 430/7 |
| 7,423,710 | B2 * | 9/2008 | Lee et al. | 349/110 |
| 2003/0127048 | A1 * | 7/2003 | Kokubo et al. | 118/410 |
| 2004/0229139 | A1 * | 11/2004 | Tanaka et al. | 430/7 |
| 2007/0002219 | A1 * | 1/2007 | Lee et al. | 349/106 |
| 2007/0139603 | A1 * | 6/2007 | Saegusa et al. | 349/155 |
| 2008/0018843 | A1 * | 1/2008 | Park et al. | 349/139 |
| 2008/0024708 | A1 * | 1/2008 | Park et al. | 349/139 |
| 2008/0158457 | A1 * | 7/2008 | Park et al. | 349/39 |
| 2009/0202942 | A1 * | 8/2009 | Fukui et al. | 430/283.1 |
| 2009/0310052 | A1 * | 12/2009 | Huang et al. | 349/40 |

FOREIGN PATENT DOCUMENTS

JP 2001-051263 2/2001

* cited by examiner

*Primary Examiner* — Alexander Ghyka  
*Assistant Examiner* — Stanetta Isaac  
(74) *Attorney, Agent, or Firm* — K&L Gates LLP

(57) ABSTRACT

A manufacturing method for a liquid crystal apparatus of a transverse electric field system that is provided with a liquid crystal layer sandwiched between a first substrate and a second substrate and a pixel electrode and a common electrode formed on the first substrate and is arranged to drive liquid crystal through an electric field generated between the pixel electrode and the common electrode includes the steps of forming a material layer made of photosensitive resin on a glass substrate and performing an exposure processing with a predetermined exposure pattern, performing a development processing on the material layer and forming a resin light interruption layer having an opening section that exposes the glass substrate in a bottom section, forming an electrostatic interruption layer while covering the resin light interruption layer, and providing a colored layer in an area overlapped with the opening section on the electrostatic interruption layer.

4 Claims, 7 Drawing Sheets

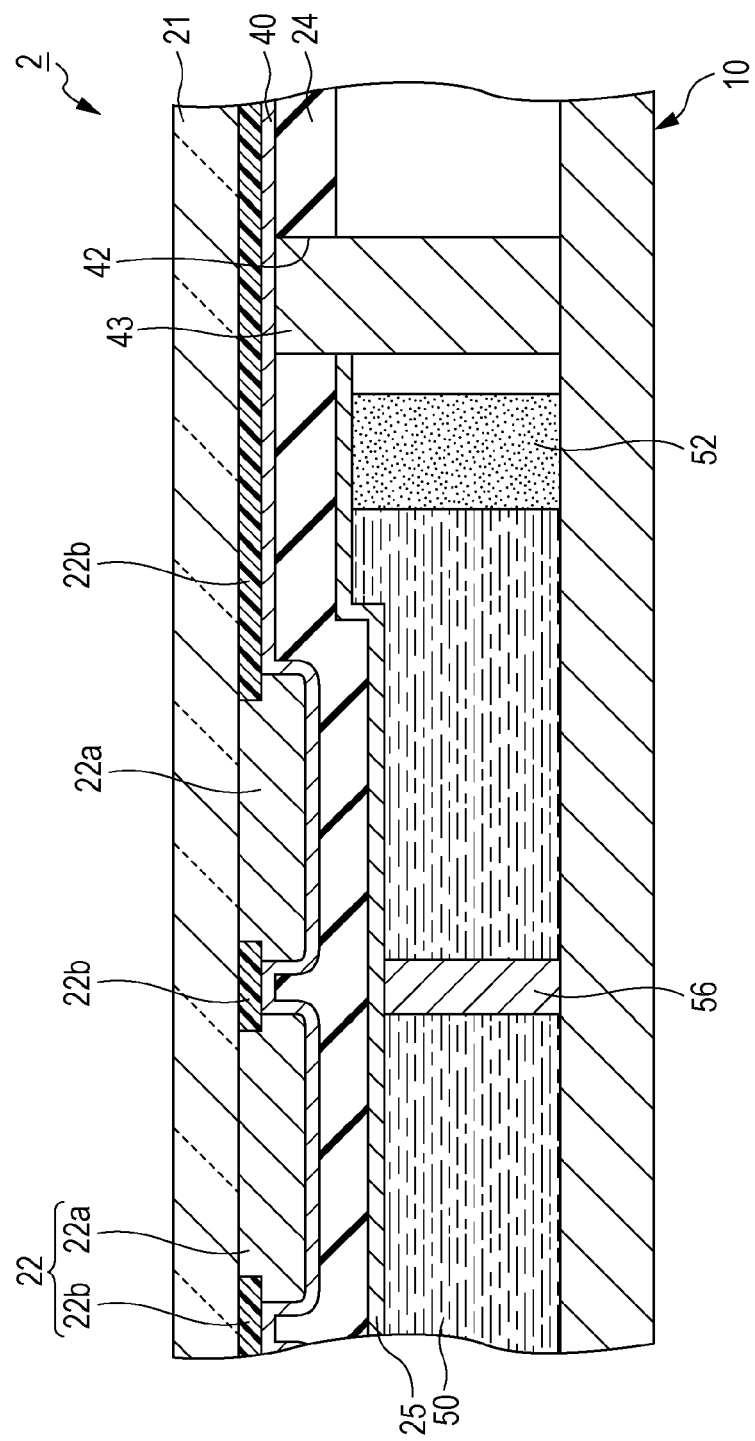

MANUFACTURING METHOD FOR LIQUID CRYSTAL APPARATUS

CROSS REFERENCES TO RELATED APPLICATIONS

The present application contains subject matter related to that disclosed in Japanese Priority Patent Application JP 2008-252587 filed in the Japan Patent Office on Sep. 30, 2008, the entire contents of which are hereby incorporated by reference.

BACKGROUND

The present application relates to a manufacturing method for a liquid crystal apparatus.

As a method of expanding a view angle of a liquid crystal apparatus, a so-called IPS (In-Plane Switching) system of a transverse electric field system is in practical use in which an electric field in an in-plane direction (transverse direction) with respect to a substrate is generated and transmitted light is controlled by rotating liquid crystal molecules in the electric field in this transverse direction within the plane that is parallel to the substrate. Furthermore, an FFS (Fringe-Field Switching) system obtained by devising this IPS system is proposed.

The above-mentioned liquid crystal apparatus of the transverse electric field system has a configuration in which electrodes such as common electrodes and pixel electrodes or conductive components such as a wiring are arranged on an element substrate where drive elements such as TFTs are formed, and the conductive components are not provided on an opposed substrate that is on a display surface side. For that reason, the liquid crystal apparatus may be subjected to an influence of an external electric field represented by static electricity or the like from an external part on the opposed substrate side, and a problem arises that disturbance may occur in liquid crystal display. To solve this, a method of forming a transparent electroconductive film on the opposed substrate side and capturing static electricity by the transparent electroconductive film to prevent the display disturbance is proposed (for example, Japanese Unexamined Patent Application Publication No. 2001-51263).

Japanese Unexamined Patent Application Publication No. 2001-51263 exemplifies a configuration in which the transparent electroconductive film is provided on an outer side of a glass substrate provided to the opposed substrate (on an opposite side to a liquid crystal layer) and a configuration in which the transparent electroconductive film is provided on an inner side of the glass substrate (on the liquid crystal layer). When these configurations are compared with each other, the opposed substrate provided with the transparent electroconductive film on the inner side has an advantage that manufacturing is facilitated because vertical inversion operations on the glass substrate or the like are not carried out as being formed while laminated with components such as an oriented film similarly provided on the inner side.

SUMMARY

However, Japanese Unexamined Patent Application Publication No. 2001-51263 proposes a configuration in which the transparent electroconductive film is formed on a rear surface of the oriented film on the opposed substrate side as a configuration of the opposed substrate provided with the transparent electroconductive film on the inner side of the glass substrate. In a case where the transparent electroconductive film is provided at the above-mentioned location, as only the oriented film exists between the transparent electroconductive film and the liquid crystal layer, a distance therebetween is close. A vertical electric field is generated between the transparent electroconductive film for capturing the static electricity and the pixel electrode or the common electrode provided on the element substrate, which may disturb the drive of the transverse electric field system. For that reason, a protection on the liquid crystal apparatus from the static electricity is not sufficient.

The present application has been made in view of the above-mentioned circumstances, and it is desirable to provide a manufacturing method for a liquid crystal apparatus in which an image disturbance caused by external static electricity is suppressed.

To provide the manufacturing method, the inventors of the present application devise a configuration in which an electrostatic interruption layer is formed at a location that is on an inner side of a glass substrate and is far from a liquid crystal layer as much as possible. For example, it is conceivable that the electrostatic interruption layer is formed at a location contacted with a front surface on the inner side of the glass substrate.

Incidentally, the liquid crystal apparatus is provided with a plurality of pixels and has a light interruption layer for interrupting light in areas between the pixels. Examples of the light interruption layer include a metallic light interruption layer formed by etching a metal thin film obtained through vacuum deposition of a metal such as chrome and a resin light interruption layer formed of resin obtained by dispersing black pigments or the like. Among those, as compared with the metallic light interruption layer, the resin light interruption layer has an advantage that the layer is not subjected to a process of the vacuum deposition or the like and formation is facilitated also on a large-area substrate.

In view of the above, to obtain the devised configuration as described above, the inventors of the present application carry out such a study that on the glass substrate on which the electrostatic interruption layer is formed, the resin light interruption layer is laminated on the electrostatic interruption layer, but residue remains at the time of development to cause patterning failure, and a satisfactory resin light interruption layer is not formed as a result. Also, when a development condition is set in which the residue does not remain, exfoliation of a used part occurs, and a satisfactory resin light interruption layer is not formed again as a result.

In general, the resin light interruption layer is formed on the glass substrate provided with a flat surface in many cases and is formed by performing patterning with use of photolithography. For that reason, for a formation material of the resin light interruption layer, on the premise of being formed on the glass substrate, a principal chain backbone or a side chain is designed, and a reaction condition for the photolithography is decided. Under the circumstances, it is found out that the formation of the resin light interruption layer on the electrostatic interruption layer is difficult.

In view of the above, to provide the above-mentioned method, a manufacturing method for a liquid crystal apparatus of a transverse electric field system that is provided with a liquid crystal layer sandwiched between a first substrate and a second substrate and a pixel electrode and a common electrode formed on the first substrate and is arranged to drive liquid crystal through an electric field generated between the pixel electrode and the common electrode according to an embodiment includes the steps of: forming a material layer made of photosensitive resin on a glass substrate and performing an exposure processing with a predetermined exposure pattern; performing a development processing on the material layer and forming a resin light interruption layer having an opening section that exposes the glass substrate in a bottom section; forming an electrostatic interruption layer while covering the resin light interruption layer; and providing a colored layer in an area overlapped with the opening section on the electrostatic interruption layer.

Also, a manufacturing method for a liquid crystal apparatus of a transverse electric field system that is provided with a liquid crystal layer sandwiched between a first substrate and a second substrate and a pixel electrode and a common electrode formed on the first substrate and is arranged to drive liquid crystal through an electric field generated between the pixel electrode and the common electrode according to another embodiment includes the steps of: forming a material layer made of photosensitive resin on a glass substrate and performing an exposure processing with a predetermined exposure pattern; performing a development processing on the material layer and forming a resin light interruption layer having an opening section that exposes the glass substrate in a bottom section; providing a colored layer in an area overlapped with the opening section and forming a color filter layer; and forming an electrostatic interruption layer while covering the resin light interruption layer and the colored layer.

According to these methods, as the resin light interruption layer is formed in advance on the glass substrate, it is facilitated to remove the formation material for the resin light interruption layer at the time of the development, and it is possible to carry out the satisfactory patterning without leaving residue. As the electrostatic interruption layer is provided after the formation of the resin light interruption layer satisfactorily formed, the provision of the electrostatic interruption layer does not affect the formation of the resin light interruption layer. For that reason, it is possible to provide the manufacturing method for the liquid crystal apparatus having the satisfactorily patterned resin light interruption layer and the electrostatic interruption layer for capturing the static electricity in which the image disturbance caused by external static electricity is suppressed.

According to an embodiment, the manufacturing method desirably includes the step of forming an insulating layer that coverts the electrostatic interruption layer and the colored layer.

According to this method, as the distance between the electrostatic interruption layer and the liquid crystal layer is further increased by the thickness of the insulating layer, the voltage decrease occurs, and the force of the static electricity captured by the electrostatic interruption layer which acts on the liquid crystal layer (coulomb force) weakens. For that reason, it is possible to provide the manufacturing method for the liquid crystal apparatus in which as compared with the apparatus having no insulating layer, the image disturbance caused by the static electricity is prevented, and the high quality image display can be carried out.

According to an embodiment, the manufacturing method desirably includes the steps of forming a first contact hole that exposes the electrostatic interruption layer on the insulating layer, forming a drive circuit and a routing wiring electrically connected to the drive circuit on the first substrate, and arranging a conductive material at a location overlapped with the first contact hole in a planar manner and electrically connecting the routing wiring with the electrostatic interruption layer.

According to this method, as the charge of the static electricity captured by the electrostatic interruption layer is kept at a potential set by the drive circuit, the static electricity is not accumulated or increased even after the use for a long period of time, and it is possible to provide the manufacturing method for the liquid crystal apparatus in which the image disturbance due to the influence of the static electricity is suppressed.

According to an embodiment, the manufacturing method desirably includes the steps of, after the forming the routing wiring, forming an insulating film that covers the routing wiring, forming a second contact hole that exposes a part of the routing wiring on the insulating film, and forming an electroconductive film that covers the routing wiring inside the second contact hole, in which in the electrically connecting, the conductive material is arranged in contact with the electroconductive film.

According to this method, as the electroconductive film prevents the oxidation of the routing wiring that is exposed within the second contact hole and also the satisfactory continuity is obtained, it is possible to provide the manufacturing method for the liquid crystal apparatus in which the charge accumulated in the electrostatic interruption layer is effectively discharged, and the satisfactory display can be carried out. In particular, the formation material for the routing wiring is desirably a basic metal such as aluminum because the front surface oxidation is satisfactorily prevented, and the continuity can be secured.

According to an embodiment, in the forming the electroconductive film, an electroconductive metal oxide is desirably used as a formation material.

According to this method, the oxidation of the routing wiring that is exposed in the bottom section of the contact hole can be satisfactorily prevented.

According to an embodiment, the manufacturing method desirably includes the step of, after the pixel electrode is formed on the first substrate, forming the common electrode that is overlapped with the pixel electrode via an insulating film.

According to this method, the distance between the electrostatic interruption layer that captures the static electricity and the pixel electrode is further increased. For that reason, it is possible to provide the manufacturing method for the liquid crystal apparatus in which the electric field in the vertical direction generated between the pixel electrode and the electrostatic interruption layer can be restrained to a minute level, and the image disturbance is suppressed.

Additional features and advantages are described herein, and will be apparent from the following Detailed Description and the figures.

BRIEF DESCRIPTION OF THE FIGURES

FIG. 7 is a schematic cross sectional view of a liquid crystal apparatus manufactured through a manufacturing method according to a second embodiment.

DETAILED DESCRIPTION

Embodiments of the present application will be described below in detail with reference to the drawings.

Hereinafter, with reference to FIGS. 1 to 5 and FIGS. 6A to 6E, a manufacturing method for a liquid crystal apparatus manufactured according to an embodiment will be described. It should be noted that in all of the following drawings, to facilitate visualization of the drawings, thicknesses of the respective components, dimensional ratios, and the like are appropriately varied.

The liquid crystal apparatus manufactured through the manufacturing method according to the present embodiment is arranged to perform image display by controlling azimuth angles of liquid crystal molecules by transverse electric field that is orthogonal to a travelling direction of light. For such a system, an FFS system, an IPS system, and the like are proposed. Hereinafter, a description will be given on the basis of a liquid crystal apparatus capable of performing full-color display among liquid crystal apparatuses that adopt a drive system based on the FFS system, but embodiments of the present application can be applied to a liquid crystal apparatus of the IPS system.

Figure 1:
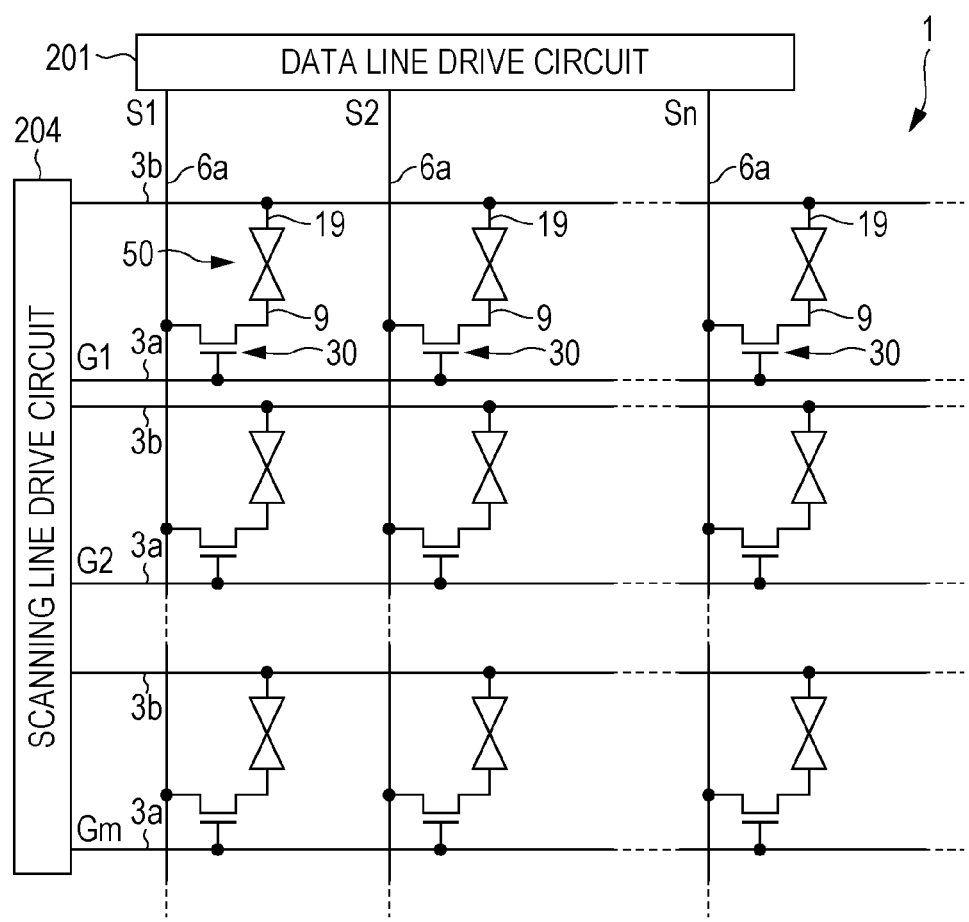
FIG. 1 is an equivalent circuit diagram of a liquid crystal apparatus manufactured through a manufacturing method according to a first embodiment.

FIG. 1 is an equivalent circuit diagram of a liquid crystal apparatus 1 manufactured through a manufacturing method according to the present embodiment. In a plurality of sub pixel areas formed in a matrix shape constituting an image display area of the liquid crystal apparatus 1, the pixel electrode 9 and a TFT 30 for performing a switching control on the pixel electrode 9 are formed. A liquid crystal layer 50 intervenes between the pixel electrode 9 and a common electrode 19. The common electrode 19 is electrically connected to a common line 3b extending from the scanning line drive circuit 204 and held at a common potential in the plurality of sub pixels.

A data line 6a extending from a data line drive circuit 201 is electrically connected to a source of the TFT 30. The data line drive circuit 201 supplies image signals S1, S2, . . . , Sn to the respective sub pixels via the data lines 6a. The image signals S1 to Sn may be supplied line-sequentially in the stated order or may be supplied to each group for the plurality of mutually adjacent data lines 6a.

A scanning line 3a extending from the scanning line drive circuit 204 is electrically connected to a gate of the TFT 30. Scanning signals G1, G2, . . . , Gm supplied in a pulse manner from the scanning line drive circuit 204 to the scanning line 3a at a predetermined timing are applied line-sequentially to the gate of the TFT 30 in the stated order.

The pixel electrode 9 is electrically connected to a drain of the TFT 30. As the TFT 30 functioning as a switching element is put into an ON state for a certain period of time in response to an input of the scanning signals G1, G2, . . . , Gm, the image signals S1, S2, . . . , Sn supplied from the data line 6a are written in the pixel electrode 9 at a predetermined timing. The image signals S1, S2, . . . , Sn at a predetermined level written in the liquid crystal layer 50 via the pixel electrode 9 are held between the pixel electrode 9 and the opposing common electrode 19 via the liquid crystal layer 50 for a certain period of time.

Figure 2:
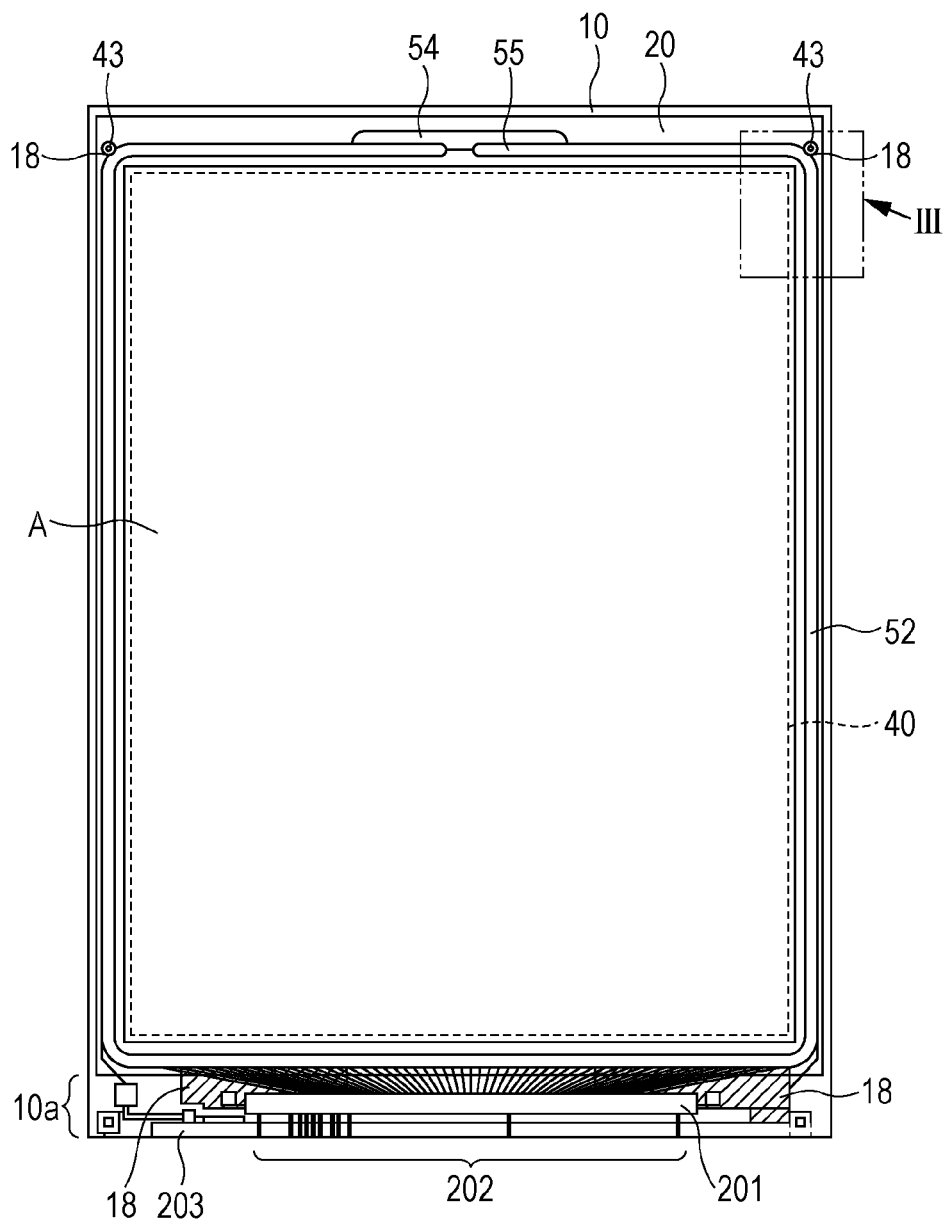
FIG. 2 is a schematic plan view of the liquid crystal apparatus manufactured through the manufacturing method according to the first embodiment.
Figure 3:
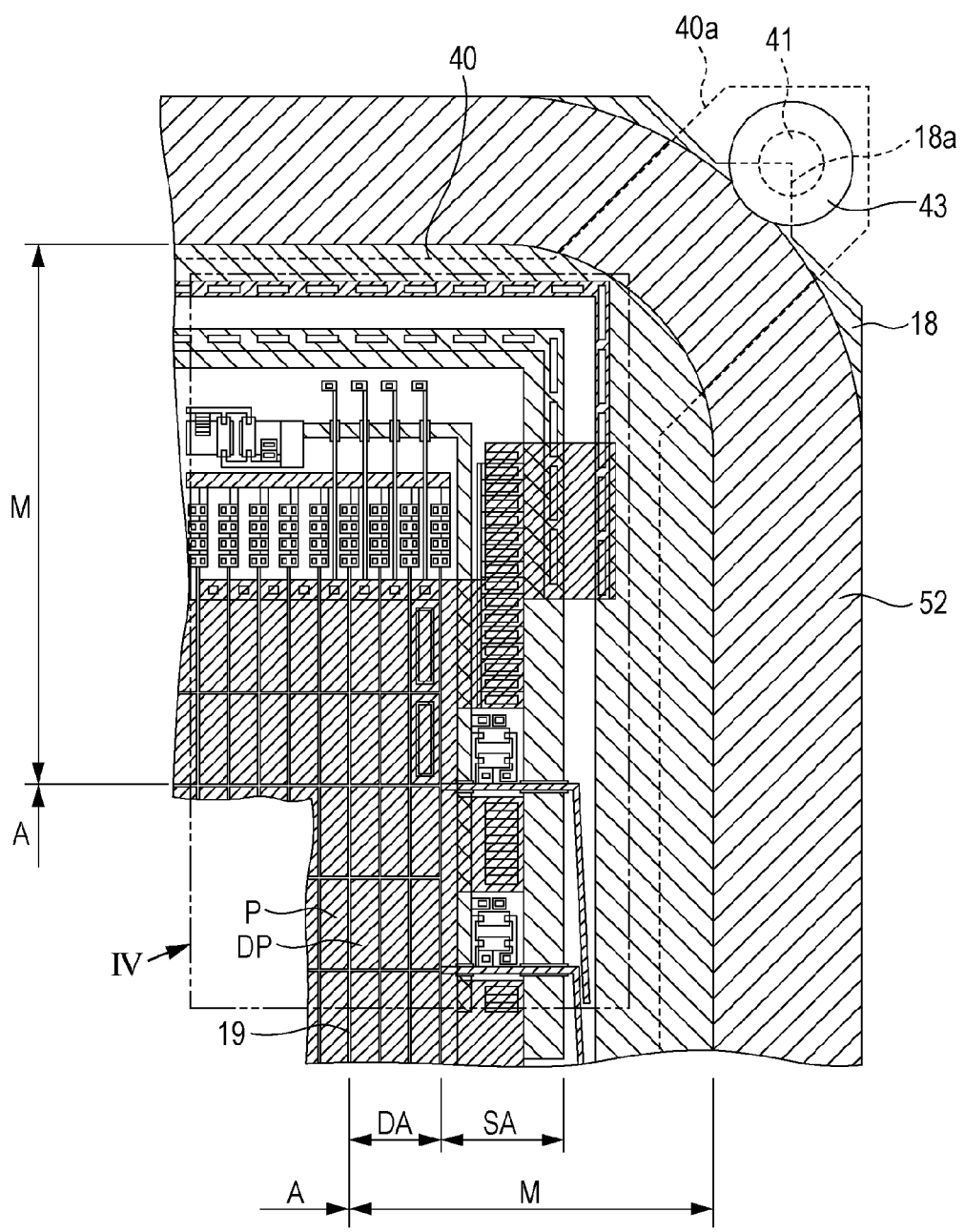
FIG. 3 is another schematic plan view of the liquid crystal apparatus manufactured through the manufacturing method according to the first embodiment.
Figure 4:
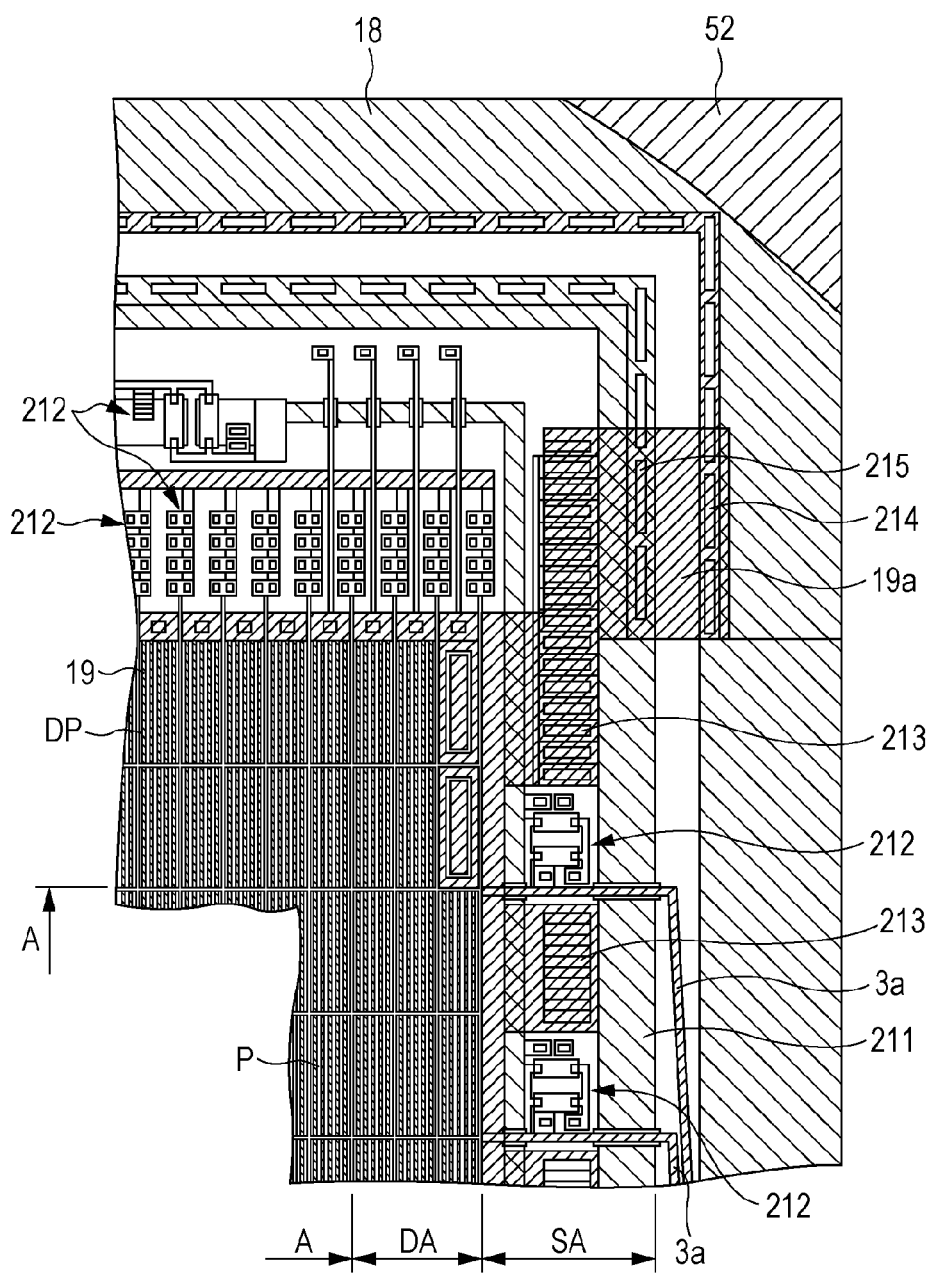
FIG. 4 is another schematic plan view of the liquid crystal apparatus manufactured through the manufacturing method according to the first embodiment.

FIGS. 2 to 4 are plan views of the liquid crystal apparatus 1 manufactured through the manufacturing method according to the present embodiment as seen from an opposed substrate (second substrate) side, in which FIG. 3 is an enlarged view of a part of FIG. 2, and FIG. 4 is an enlarged view of a part of FIG. 3.

As illustrated in FIG. 2, in the liquid crystal apparatus 1 according to the present embodiment, an element substrate (first substrate) 10 and an opposed substrate 20 are affixed by a sealing member 52 in a peripheral part in a section where the element substrate 10 and the opposed substrate 20 are overlapped with each other in a planar manner, and the liquid crystal molecules are sealed and held in an area sectioned by the sealing member 52 (display area A). A liquid crystal inlet 55 is formed in the sealing member 52 for injecting the liquid crystal molecules after the element substrate 10 and the opposed substrate 20 are affixed to each other at the time of manufacturing, and the liquid crystal inlet 55 is sealed by a sealing member after the liquid crystal injection. A pixel electrode and a common electrode which are not illustrated in the drawing are formed in an area that is on an inner surface side of the element substrate 10 and is overlapped with the display area A in a planar manner. A routing wiring 18 is provided in an area that is on the inner surface side of the element substrate 10 and is overlapped with the sealing member 52.

A driving IC 201 for processing a drive signal for driving the liquid crystal apparatus 1 to be appropriately supplied is mounted in a section that is on one end side of the element substrate 1 and is projecting from the section where the element substrate 10 and the opposed substrate 20 are overlapped with each other (substrate projecting section 10a), and an input terminal 202 is provided in an end section. An FPC (Flexible Printed Circuit) substrate or the like on which wirings are formed is mounted to the input terminal 202, for example, via an anisotropic electroconductive film 203 and connected to an external power source or various external devices.

Also, an electrostatic shield layer (electrostatic interruption layer) 40 which will be described below is provided on the inner side of the opposed substrate 20 and is electrically in continuity with the routing wiring 18 of the element substrate 10 via a conductive member (conductive connection section) 43 arranged at least at one location in a corner section of the opposed substrate 20. In the liquid crystal apparatus 1 according to the present embodiment, The conductive members 43 are provided at two locations in both end sections on the other end side of the element substrate 10 (on a side facing a side on the driving IC 201 side). In the liquid crystal apparatus 1, other components such as a phase plate and a polarizing plate are arranged in a predetermined orientation when requested, but illustration thereof will be omitted herein.

FIG. 3 is an expanded view of an area III surrounded by a two-dot chain line in FIG. 2. Here, a configuration on the element electrode side is mainly illustrated.

As illustrated in the drawing, a plurality of sub pixel P having substantially a rectangular shape in plan view are arranged in a matrix shape vertically and horizontally in the display area A. Also, a non-display area M exists on an inner side of the sealing member 52 in the vicinity of the display area A. The non-display area M is provided with an electrostatic protection area SA for discharging static electricity infiltrating from the routing wiring 18 and protecting the sub pixel P arranged in the display area A and a dummy area DA where a dummy pixel (electrostatic protection member) DP is arranged which is to be destructed to substitute itself for the destruction of the sub pixel P that is caused by the static electricity not fully discharged by the electrostatic protection area SA.

The routing wiring 18 for supplying the common potential to the common electrode 19 is formed while being overlapped with the sealing member 52 in a surrounding of the display area A in the element substrate 10, and a connection section 18*a* protruding on the outer side (on a opposite side to the liquid crystal layer 50) is formed at a corner where the routing wiring 18 bends.

On the other hand, a connection section 40*a* protruding on the outer side is also formed at a corner section of the electrostatic shield layer 40 provided to the opposed substrate which is not illustrated. The connection section 40*a* and the connection section 18*a* are overlapped with each other in a planar manner. Also those sections are both formed to be extended up to the outer side of the sealing member 52 and are electrically connected via the conductive member 43 in the respective end sections. Therefore, the potential at the electrostatic shield layer 40 is kept at the same potential as the common potential.

FIG. 4 is an expanded view of an area IV surrounded by a two-dot chain line in FIG. 3.

As illustrated in the drawing, the dummy area DA having the plurality of dummy pixels DP arranged in the surrounding of the sub pixel P and the electrostatic protection area SA having a short ring (electrostatic protection member) 211 and a resistance element (electrostatic protection member) 212 arranged in an area between the dummy area DA and the sealing member 52 are provided in the non-display area M. The short ring 211 and the resistance element 212 of the electrostatic protection area SA are provided for protecting the TFT arranged for each sub pixel P from the static electricity mainly generated during a manufacturing process.

The static electricity generated during a manufacturing process infiltrates from the surrounding of the display area A into the sub pixel P. For that reason, the generated static electricity is discharged by the function of the electrostatic protection area SA, and also the static electricity that is not fully discharged destructs the dummy pixel DP arranged in the dummy area DA, thus preventing the destruction of the sub pixel P.

The resistance elements 212 are provided in the end sections of the respective columns and rows while corresponding to the columns and rows where the sub pixels P and the dummy pixels DP are arranged. In the drawing, the resistance element 212 is provided every other line with respect to the rows for the sub pixels P and the dummy pixels DP (even-numbered rows counted from the row on the upper end) and connected to the scanning line 3*a* on the respective rows. Also, on a left side on a side opposed to the right side illustrated in the drawing, the resistance elements 212 corresponding to the remaining rows (odd-numbered rows) are provided although an illustration thereof is omitted. Also, the resistance element 212 is provided for each column also on the upper end section of the columns for the sub pixels P and the dummy pixels DP.

Also, the common electrode 19 is formed while covering the sub pixel P and the dummy pixel DP, and an overhang section 213 for a connection with the short ring 211 is provided in an end section on the side where the resistance element 212 is provided. The overhang section 213 is provided at a location which is not overlapped with the resistance element 212, and the common electrode 19 and the short ring 211 are connected via the overhang section 213.

Also, a connection section 19*a* having substantially a rectangular shape in plan view for a connection with the routing wiring 18 is provided in the overhang section 213 provided at the corner section on the upper end of the common electrode 19, and mutual connections are established via a plurality of contact holes 214. Also, the connection section 19*a* is also connected to the short ring 211 via a plurality of contact holes 215. With these members provided in the electrostatic protection area SA, the electrostatic destruction of the TFT provided in the sub pixel P is prevented.

Also, the electrostatic shield layer 40 is provided while being overlapped in a planar manner with the respective components in the dummy area DA and the electrostatic protection area SA. The electrostatic shield layer 40 has a function of capturing the static electricity from an external section as will be described below and prevents the destruction of the respective components in the dummy area DA and the electrostatic protection area SA due to the static electricity. For that reason, in the dummy area DA or the electrostatic protection area SA, it is possible to satisfactorily prevent the destruction of the sub pixel P. Also, as the electrostatic shield layer 40 is electrically connected to the respective components in the dummy area DA and the electrostatic protection area SA, the static electricity can be dispersed in cooperation with each other.

Figure 5:
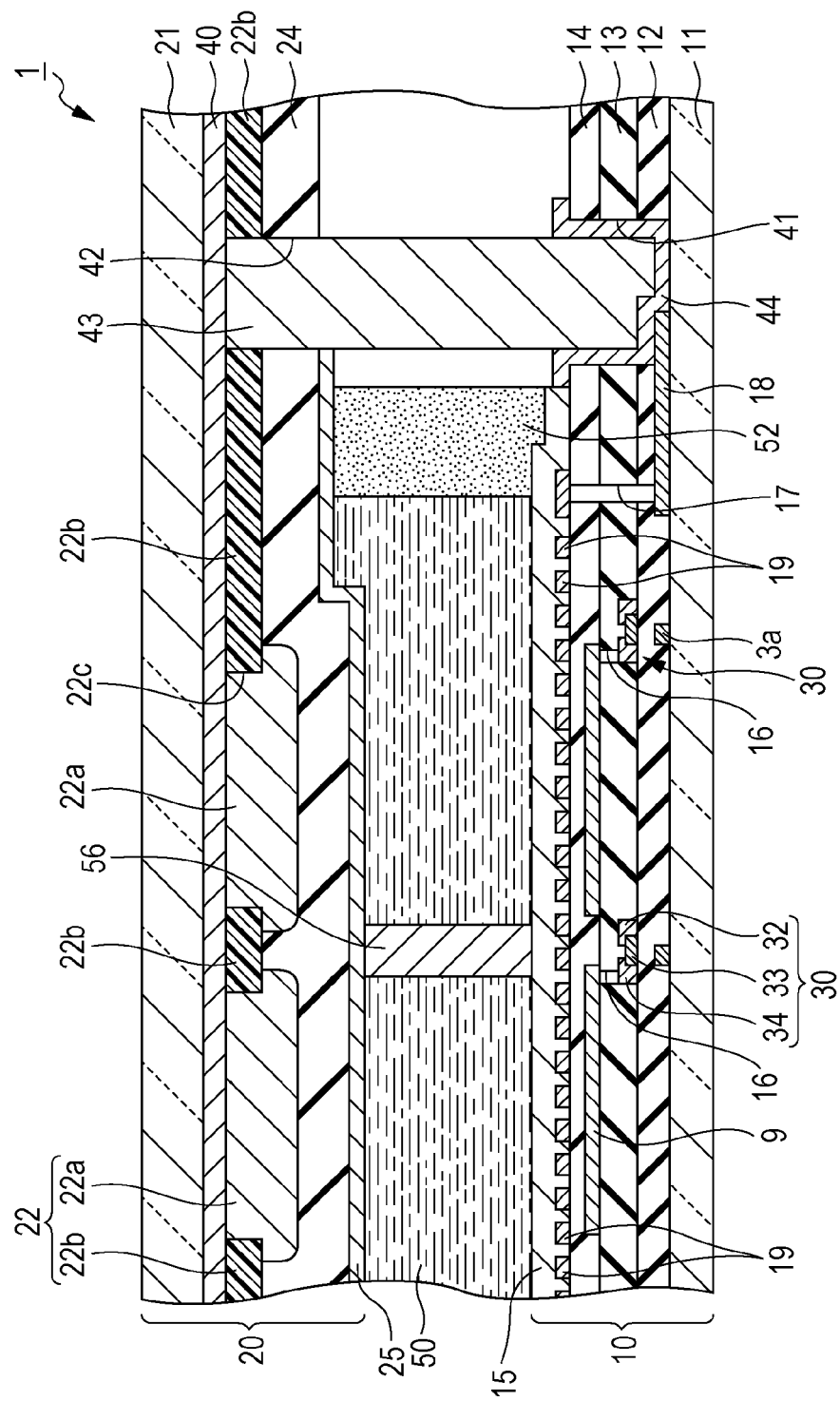
FIG. 5 is a schematic cross sectional view of the liquid crystal apparatus manufactured through the manufacturing method according to the first embodiment.

FIG. 5 is a schematic cross sectional view of surroundings of the sealing member 52 and the conductive member 43 in the liquid crystal apparatus 1 manufactured through the manufacturing method according to the present embodiment. Here, to facilitate visualization of the drawing, the configuration in the non-display area is omitted for illustration.

As illustrated in the drawing, the liquid crystal apparatus 1 is configured by including the element substrate 10, the opposed substrate 20 arranged so as to oppose the element substrate 10, and the liquid crystal layer 50 sandwiched between the element substrate 10 and the opposed substrate 20. Also, in the liquid crystal apparatus 1, the sealing member 52 is provided along an outside edge of the area where the element substrate 10 is opposed to the opposed substrate 20, and the liquid crystal molecules constituting the liquid crystal layer 50 are sealed. A configuration is adopted that the liquid crystal apparatus 1 is irradiated with illumination light from the element substrate 10 side, and a displayed image is observed from the opposed substrate 20 side.

The element substrate 10 is provided with a substrate main body 11 having translucency. For a material for forming the substrate main body 11, for example, mineral such as glass, silica glass, or silicon nitride or organic high polymer (resin) such as acrylic resin or polycarbonate resin can be used. Also, as long as the translucency is provided, it is possible to use a composite material formed by laminating or mixing these materials.

The scanning line 3*a* made of a conductive material such as aluminum or copper and the data line which is not illustrated in the drawing are formed on a surface on the liquid crystal layer 50 side of the substrate main body 11. Also, the routing wiring 18 made of a similar conductive material is formed in an area overlapped with the sealing member 52 in a planar manner. The same material can be used for these components, and also different materials may be used for the formation. These components are obtained, for example, by patterning after a thin film made of a conductive material is formed. According to the present embodiment, aluminum is used for the formation material.

Also, a gate insulating film 12 is formed on the substrate main body 11 so as to cover the scanning line 3*a*, the data line, and the routing wiring 18. The gate insulating film 12 is made of a translucent material having insulation properties such as silicon nitride or silicon oxide.

A semiconductor layer 32, a source electrode 33 connected to one end of the semiconductor layer 32, and a drain electrode 34 connected to the other end of the semiconductor layer 32 are formed on the gate insulating film 12. The semiconductor layer 32, the source electrode 33, the drain electrode 34, and the scanning line 3a constitute the bottom-gate type TFT 30. Also, an interlayer insulating film 13 is formed so as to cover the TFT 30. The interlayer insulating film 13 is similarly made of a translucent material having insulation properties such as silicon nitride or silicon oxide like the gate insulating film 12.

The pixel electrode 9 is formed on the interlayer insulating film 13 and is electrically connected to the drain electrode 34 of the TFT 30 via a contact hole 16. The pixel electrode 9 is formed of an electroconductive material having translucency such as ITO (Indium Tin Oxide) or tin oxide (SnO2). According to the present embodiment, ITO is used.

Also, an inter-electrode insulating film 14 is formed on the interlayer insulating film 13 while covering the pixel electrode 9. The inter-electrode insulating film 14 is similarly made of a translucent material having insulation properties such as silicon nitride or silicon oxide like the gate insulating film 12 or the interlayer insulating film 13 and covers the pixel electrode 9 formed on the interlayer insulating film 13.

The common electrode 19 having a ladder shape is formed on the inter-electrode insulating film 14. The pixel electrode 9 and the common electrode 19 are arranged via the inter-electrode insulating film 14 and constitute an electrode structure of the FFS system. Also, the common electrode 19 is connected to the routing wiring 18 via a contact hole 17 communicated with the gate insulating film 12, the interlayer insulating film 13, and the inter-electrode insulating film 14. The common electrode 19 is formed of a conductive material having translucency such as ITO. According to the present embodiment, ITO is used for the material for the common electrode 19.

Also, an oriented film 15 is formed on the inter-electrode insulating film 14 while covering the common electrode 19. The oriented film 15 is, for example, composed of an organic material such as polyimide or a mineral material such as silicon oxide. The oriented film 15 according to the present embodiment is obtained by applying the polyimide formation material, drying and hardening this material, and thereafter performing a rubbing processing on an upper surface thereof.

On the other hand, the opposed substrate 20 is provided with the substrate main body 21 having translucency. For the material for forming the substrate main body 21, a similar material for forming the substrate main body 11 can be used.

A black matrix 22b is formed on a surface on the liquid crystal layer 50 side of the substrate main body 21. The black matrix 22b is formed, for example, by patterning on a lattice by using negative type photosensitive resin such as acrylic resin mixed with black pigments.

Also, the electrostatic shield layer 40 is formed on the surface on the liquid crystal layer 50 side of the substrate main body 21 while covering the front surfaces of the substrate main body 21 and the black matrix 22b. The electrostatic shield layer 40 is provided so as to capture the static electricity from an external section and let the captured static electricity out via the conductive member 43 which will be described below, thus preventing unexpected generation of vertical electric field between the opposed substrate 20 and the element substrate 10. The electrostatic shield layer 40 is formed by using a conductive material having translucency such as ITO or SnO2, and according to the present embodiment, ITO is used for the formation material.

A colored layer 22a is formed on a surface on the liquid crystal layer 50 side of the electrostatic shield layer 40. On the electrostatic shield layer 40 that is overlapped with an opening section 22c provided on the black matrix 22b by patterning, the colored layer 22a is formed by arranging the formation material for the colored layer 22a by using a wet application method such as a droplet discharge method. The plurality of colored layers 22a and the black matrices 22b constitute color filter layers 22.

According to the present embodiment, for film thicknesses of the respective layers, the colored layer 22a is set as 2 μm, and the black matrix 22b is set as 1.5 μm. With the color filter layers 22, light entering from the element substrate 10 side and exiting towards the opposed substrate 20 side is modulated into red, green, or blue, and by mixing the lights of the respective colors, full-color display can be carried out.

An overcoat layer (insulating layer) 24 is formed on the color filter layer 22. The overcoat (OVC) layer 24 physically or chemically protects the color filter layer 22 and is provided with a function of mitigating irregular shapes on the front surface of the color filter layer 22. Also, the overcoat layer 24 prevents occurrence of image disturbance caused by a low-molecular-weight material such as reaction residue of the hardening agent or an ionic impurity in the respective formation materials eluting into the liquid crystal layer 50 from the formed colored layer 22a and black matrix 22b. The OVC layer 24 is formed, for example, by using hardening resin such as acrylic resin or epoxy resin having translucency. According to the present embodiment, acrylic resin is used, and the film thickness is set as 2 μm for the formation.

An oriented film 25 is formed on the OVC layer 24 by using a material similar to the oriented film 15. The oriented film 25 according to the present embodiment is obtained by applying the polyimide formation material, drying and hardening this material, and thereafter performing a rubbing processing on an upper surface thereof is obtained by applying the polyimide formation material, drying and hardening this material, and thereafter performing a rubbing processing on an upper surface thereof in a certain direction. The orientation direction of the oriented film 25 by the rubbing is set to be the same direction as the orientation direction of the oriented film 15.

Also, a spacer 56 is formed in an area overlapped with the black matrix 22b on the OVC layer 24 in an area overlapped with the liquid crystal layer 50. The spacer 56 is used for keeping a separating distance between the element substrate 10 and the opposed substrate 20 so as not to be smaller than or equal to a certain level. For example, in a case where stress is applied from the opposed substrate 20 side, as the thickness of the liquid crystal layer 50 does not become smaller than a height of the spacer 56, it is possible to prevent the image disturbance.

The routing wiring 18 provided to the element substrate 10 and the electrostatic shield layer 40 provided to the opposed substrate 20 are in continuity via the conductive member 43 in an area on an outer side of the sealing member 52 (on an opposite side to the liquid crystal layer 50) enclosing the surrounding of the liquid crystal layer 50. For the conductive member 43, hardening resin mixed with particles having conductive properties, silver paste, or the like can be used. The particles having conductive properties, for example, include one obtained by coating the front surface of particles having no conductive properties with metallic particles such as Au or Ag, a material such as a metal having conductive properties, or the like.

A contact hole (second contact hole) 41 that is penetrating and is mutually communicated with the gate insulating film 12, the interlayer insulating film 13, and the inter-electrode insulating film 14 is formed in an area where the conductive member 43 on the element substrate 10 side is arranged, and the routing wiring 18 is partially exposed in a bottom section.

For the formation material for the routing wiring 18 according to the present embodiment, aluminum that is a basic metal is used. Therefore, if the contact hole 41 is formed and exposed, the front surface is oxidized to form an oxide film, which may prohibit continuity. Also, in the bottom section of the contact hole 41, only a part of the routing wiring 18 is exposed, and a conduction area with the conductive member 43 is small. For that reason, to prevent the front surface oxidation of the routing wiring 18 and also ensure the continuity to the conductive member 43, it is desirable to form an electroconductive film 44 by using a formation material such as ITO or SnO2 while covering the contact hole 41.

Also, a contact hole (first contact hole) 42 that is penetrating and is mutually communicated with the OVC layer 24 is formed in an area where the conductive member 43 is arranged on the opposed substrate 20 side. The liquid crystal apparatus 1 according to the present embodiment has the above-mentioned configuration.

Next, by using FIGS. 6A to 6E, a manufacturing method for the liquid crystal apparatus 1 will be described while mainly focusing on a manufacturing method for the opposed substrate 20. FIGS. 6A to 6E are process charts related to the manufacturing processing for the opposed substrate 20.

Figure 6A:
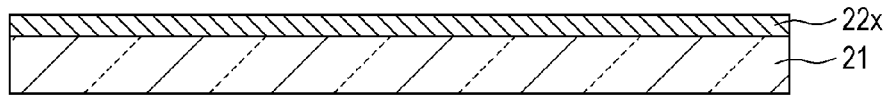
FIGS. 6A to 6E are process charts related to the manufacturing method according to the first embodiment.

First, as illustrated in FIG. 6A, a solution containing precursor of negative type photosensitive resin is applied on the substrate main body 21 to form a film of a material layer 22$x$ that is a formation material for a black matrix. The application of the solution can be performed by using a spin coat method, a droplet discharge method, a print method such as flexographic printing or screen printing, or the like.

Figure 6B:
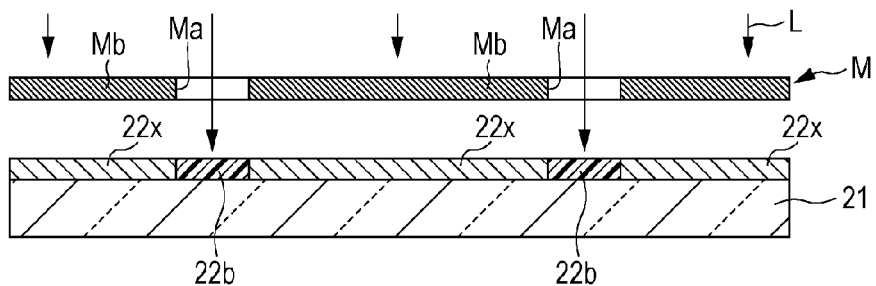

Next, as illustrated in FIG. 6B, the material layer 22$x$ is irradiated with an ultraviolet ray L through a mask M provided with an opening section Ma at a location corresponding to the formation area of the black matrix. The material layer 22$x$ exposed to the ultraviolet ray L is hardened to form a latent image of the black matrix 22$b$. Also, in an area that is covered by a light interruption section Mb of the mask M and is not irradiated with the ultraviolet ray L, a polymerization reaction does not occur, and a state of the material layer 22$x$ is maintained.

Figure 6C:

Next, as illustrated in FIG. 6C, the precursor of the negative type photosensitive resin is developed by using a developer D such as soluble organic solvent or alkaline aqueous solution, the material layer 22$x$ that is not reacted is removed. At this time, the residue of the material layer 22$x$ (the precursor of the negative type photosensitive resin) is satisfactorily removed from the front surface of the substrate main body 21 that is the glass substrate, and the development can be performed. After the material layer 22$x$ is removed, the black matrix 22$b$ having the opening section 22$c$ is developed. When requested, the developed black matrix 22$b$ is calcinated, and the negative type photosensitive resin may be appropriately hardened.

Figure 6D:
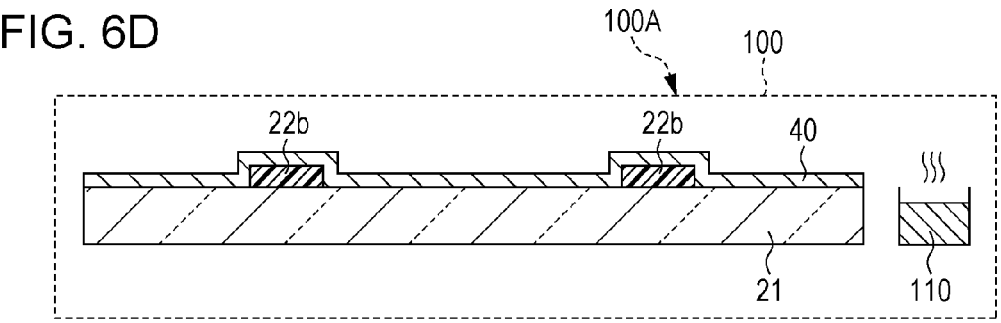

Next, as illustrated in FIG. 6D, vacuum deposition of ITO is performed in a deposition apparatus 100A to form a film of the electrostatic shield layer 40. To be more specific, a container 110 containing the formation material for the electrostatic shield layer 40 and the substrate main body 21 where the black matrix 22$b$ is formed are arranged in an airtight container 100, and the container 110 is heated after the inside of the airtight container 100 is decompressed to vacuum, so that the evaporating formation material for black matrix 22$b$ is deposited on the front surface of the substrate main body 21. Herein, the electrostatic shield layer 40 is formed through the deposition, but other than that, for example, a technology in related art such as a spattering method or a plasma CVD method can also be used.

Figure 6E:
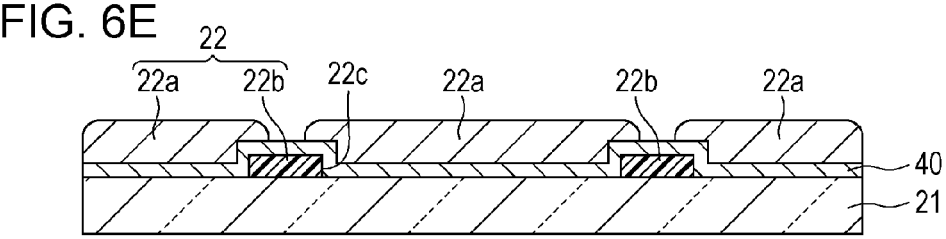

Next, as illustrated in FIG. 6E, the formation material for the colored layer is arranged in an area overlapped with the opening section 22$c$ on the electrostatic shield layer 40 to form the colored layer 22$a$. In the above-mentioned manner, the opposed substrate 20 having the black matrix 22$b$ and the electrostatic shield layer 40 can be formed. By using the thus manufactured opposed substrate 20, it is possible to manufacture the liquid crystal apparatus 1 through a method in related art.

According to the manufacturing method for the liquid crystal apparatus having the above-mentioned configuration, as the black matrix 22$b$ made of resin on the substrate main body 21 that is the glass substrate is formed in advance, it is facilitated to remove the material layer 22$x$ at the time of the development, and it is possible to perform the satisfactory patterning without leaving the residue of the material layer 22$x$. The electrostatic shield layer 40 can be formed without affecting the formation of the black matrix 22$b$ because the electrostatic shield layer 40 is provided after the formation of the black matrix 22$b$ satisfactorily formed. For that reason, it is possible to attain the manufacturing method for the liquid crystal apparatus 1 having the black matrix 22$b$ satisfactorily subjected to the patterning and the electrostatic shield layer 40 for capturing the external static electricity.

Also, according to the present embodiment, as the OVC layer 24 covering the electrostatic shield layer 40 and the color filter layer 22 is formed, the voltage decrease corresponding to the thickness of the OVC layer 24 occurs, and it is possible to prevent the image disturbance caused by the static electricity.

Also, according to the present embodiment, as the contact hole 42 for exposing the electrostatic shield layer 40 is formed in the OVC layer 24 and connects the routing wiring 18 and the electrostatic shield layer 40 formed on the element substrate 10 side via the conductive member 43, the static electricity is not accumulated or increased even after the use for a long period of time, and it is possible to obtain the liquid crystal apparatus that suppresses the image disturbance caused by the influence of the static electricity.

Also, according to the present embodiment, as the electroconductive film 44 is formed inside the contact hole 41 for exposing the routing wiring 18, the oxidation of the routing wiring 18 is prevented, and also the satisfactory continuity is secured, so that it is possible to effectively discharge the charge accumulated in the electrostatic interruption layer.

Also, according to the present embodiment, after the pixel electrode 9 is formed, as the common electrode 19 overlapped with the pixel electrode 9 is formed via the inter-electrode insulating film 14, the distance between the electrostatic shield layer 40 for capturing the static electricity and the pixel electrode 9 can be further increased, and it is possible to restrain the electric field in the vertical direction to a minute level.

It should be noted that according to the present embodiment, the black matrix 22$b$ is formed by using the negative type photosensitive resin, but a positive type photosensitive resin may also be used. In that case, exposure is performed while following the formation pattern for the opening section 22$c$, and the positive type photosensitive resin transformed into a low molecular weight form through light irradiation is removed at the time of development. In this case too, when the black matrix 22$b$ is formed on the substrate main body 21 that is the glass substrate, it is possible to carry out the satisfactory development.

Also, according to the present embodiment, the electrostatic shield layer 40 is connected to the common electrode 19 and controlled to be at the common potential, but the configuration is not limited to this. For example, a wiring kept at a GND potential is separately formed, and by connecting the relevant wiring with the electrostatic shield layer 40, the electrostatic shield layer 40 may be kept at the GND potential.

Second Embodiment

FIG. 7 is an explanatory diagram for describing a liquid crystal apparatus according to a second embodiment. The liquid crystal apparatus according to the present embodiment is partially identical to the first embodiment. A difference resides in that the electrostatic shield layer 40 is formed while covering the color filter layer 22. Therefore, according to the present embodiment, components common to the first embodiment are assigned with the same reference symbols, and a detailed description thereof will be omitted.

With regard to the color filter layer 22 provided to a liquid crystal apparatus 2, the colored layer 22a is formed to be thicker than the black matrix 22b, and a part of the peripheral border is formed to be overlapped with the adjacent black matrix 22b. A part of the black matrix 22b is exposed between the adjacent colored layers 22a. After the formation of the color filter layer 22, the electrostatic shield layer 40 is formed while covering the front surface of the color filter layer 22.

In the liquid crystal apparatus 2 having the above-mentioned configuration too, as the black matrix 22b made of resin is formed in advance on the substrate main body 21 that is the glass substrate, it is possible to carry out the satisfactory development. As the electrostatic shield layer 40 is provided on the front surface of the color filter layer 22 having the satisfactorily formed black matrix 22b, this does not affect the formation of the black matrix 22b. For that reason, it is possible to manufacture the liquid crystal apparatus 2 having the satisfactorily patterned black matrix 22b and the electrostatic shield layer 40 for capturing the external static electricity.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A manufacturing method for a liquid crystal apparatus of a transverse electric field system that is provided with a liquid crystal layer sandwiched between a first substrate and a second substrate and a pixel electrode and a common electrode formed on the first substrate and is arranged to drive liquid crystal through an electric field generated between the pixel electrode and the common electrode, the method comprising:
    forming a material layer made of photosensitive resin on a glass substrate and performing an exposure processing with a predetermined exposure pattern;
    performing a development processing on the material layer and forming a resin light interruption layer having an opening section that exposes the glass substrate in a bottom section;
    forming an electrostatic interruption layer while covering the resin light interruption layer; and
    providing a colored layer in an area overlapped with the opening section on the electrostatic interruption layer;
    forming an insulating layer that covers the electrostatic interruption layer and the colored layer; and
    forming a first contact hole that exposes the electrostatic interruption layer on the insulating layer;
    forming a drive circuit and a routing wiring electrically connected to the drive circuit on the first substrate; and
    arranging a conductive material at a location overlapped with the first contact hole in a planar manner and electrically connecting the routing wiring with the electrostatic interruption layer.

2. The manufacturing method for the liquid crystal apparatus according to claim 1, further comprising:
    after the forming the routing wiring, forming an insulating film that covers the routing wiring;
    forming a second contact hole that exposes a part of the routing wiring on the insulating film; and
    forming an electroconductive film that covers the routing wiring inside the second contact hole,
    wherein in the electrically connecting, the conductive material is arranged in contact with the electroconductive film.

3. The manufacturing method for the liquid crystal apparatus according to claim 2,
    wherein in the forming the electroconductive film, an electroconductive metal oxide is used as a formation material.

4. The manufacturing method for the liquid crystal apparatus according to claim 1, further comprising:
    after the pixel electrode is formed on the first substrate, forming the common electrode that is overlapped with the pixel electrode via an insulating film.

* * * * *